United States Patent
Stupp

(10) Patent No.: US 6,836,748 B2
(45) Date of Patent: Dec. 28, 2004

(54) METHOD FOR CORRELATING BEHAVIOR BETWEEN TWO ELEMENTS OF A SYSTEM TO DETERMINE THE PRESENCE OF MUTUAL INTERACTION BETWEEN THE ELEMENTS

(75) Inventor: Gideon Stupp, Tel-Aviv (IL)

(73) Assignee: Sheer Networks Inc., Sunnyvale, CA (US)

( * ) Notice: Subject to any disclaimer, the term of this patent is extended or adjusted under 35 U.S.C. 154(b) by 99 days.

(21) Appl. No.: 10/087,793

(22) Filed: Mar. 5, 2002

(65) Prior Publication Data

US 2002/0128800 A1 Sep. 12, 2002

Related U.S. Application Data

(60) Provisional application No. 60/273,512, filed on Mar. 7, 2001.

(51) Int. Cl.[7] .................................................. G06F 11/30
(52) U.S. Cl. ......................................... 702/183; 702/19
(58) Field of Search .................... 702/183, 19; 600/528; 370/254, 394.42; 382/293; 345/701; 368/107

(56) References Cited

U.S. PATENT DOCUMENTS

| | | | |
|---|---|---|---|
| 5,583,861 A | 12/1996 | Holden | |
| 5,781,537 A | 7/1998 | Ramaswami et al. | |
| 5,926,462 A | 7/1999 | Schenkel et al. | |
| 6,493,637 B1 | * 12/2002 | Steeg | 702/19 |
| 6,527,729 B1 | * 3/2003 | Turcott | 600/528 |

* cited by examiner

Primary Examiner—John Barlow
Assistant Examiner—Xiuqin Sun
(74) Attorney, Agent, or Firm—AlphaPatent Associates Ltd.; Daniel J. Swirsky

(57) ABSTRACT

A method for correlating behavior between two elements of a system to determine the presence of mutual interaction between the elements, the method including measuring the behavior of two elements of a system over time with respect to mutual interaction, thereby producing two behavior functions, expressing a plurality of constraints on a theoretical distance c between the behavior functions, and determining that the elements are behaving as mutually interacting elements where there exists an actual distance c satisfies the constraints.

10 Claims, 4 Drawing Sheets

METHOD FOR CORRELATING BEHAVIOR BETWEEN TWO ELEMENTS OF A SYSTEM TO DETERMINE THE PRESENCE OF MUTUAL INTERACTION BETWEEN THE ELEMENTS

CROSS REFERENCE TO RELATED APPLICATIONS

This application claims the benefit of U.S. Provisional Patent Application Ser. No. 60/273,512, filed Mar. 7, 2001, and entitled "Using traffic to discover network topology," incorporated herein by reference in its entirety.

FIELD OF THE INVENTION

The present invention relates to system behavior measurement and correlation in general, and applications therefor.

BACKGROUND OF THE INVENTION

The practical application of behavior correlation techniques is well known in many fields of science and engineering. For example, correlations between levels of automobile traffic and traffic accidents often serve as both a starting point and a benchmark in road safety programs, while correlations between advertising expenditure over the course of an advertising campaign and consumer purchases are invaluable in determining return on investment and providing other measures of effectiveness.

Whether behavior correlation techniques may be used to determine the presence of mutual interaction between two elements of a system should be examined. Some systems, such as computer networks, have elements that mutually interact, such as by communicating with each other. Computer networks, for example, typically have many network devices that are physically and logically interconnected via communication links. While information about the devices, such as their network address, is typically readily available, information regarding how the devices are physically interconnected must typically be derived manually or by employing automatic topology discovery techniques. Thus, were behavior correlation techniques successfully applied to determine the presence of mutual interaction between elements of a computer network, such techniques could be used to determine how network devices are interconnected. Unfortunately, some systems, including computer networks, have mutually interacting elements whose behavior functions diverge over time with respect to one another, thus making behavior correlation difficult.

SUMMARY OF THE INVENTION

The present invention provides a method for correlating behavior between two elements of a system to determine the presence of mutual interaction between the elements.

In one aspect of the present invention there is provided a method for correlating behavior between two elements of a system to determine the presence of mutual interaction between the elements, the method including measuring the behavior of two elements of a system over time with respect to mutual interaction, thereby producing two behavior functions, expressing a plurality of constraints on a theoretical distance c between the behavior functions, and determining that the elements are behaving as mutually interacting elements where there exists an actual distance c satisfies the constraints.

In another aspect of the present invention the expressing step comprises maintaining an upper bound and a lower bound on the theoretical distance c, and the determining step comprises determining where the lower bound is smaller than or equal to the higher bound for any of the constraints.

In another aspect of the present invention the expressing step comprises expressing each of the constraints using at least two time-consecutive samples $(a_n, a_{n+1})$ of one of the functions and at least one sample $(b_n)$ of the other of the functions that is time-intermediate the time-consecutive samples.

In another aspect of the present invention the expressing step comprises expressing each of the constraints as $(a_n - b_n) \leq c \leq (a_{n+1} - b_n)$.

In another aspect of the present invention the expressing step comprises expressing each of the distances using at least two time-consecutive samples $(a_n, a_{n+1})$ of one of the functions and at least one sample $(b_n)$ of the other of the functions that is taken at the same time as one of the time-consecutive samples.

In another aspect of the present invention the expressing step comprises expressing each of the constraints as $(a_n - b_n) \leq c \leq (a_{n+1} - b_n)$.

In another aspect of the present invention there is provided a method for correlating behavior between two elements of a system to determine the presence of mutual interaction between the elements, the method including measuring the behavior of two elements of a system over time with respect to mutual interaction, thereby producing two behavior functions, expressing a plurality of constraints for a plurality of theoretical distances $c_i$ between the behavior functions, and determining that the elements are behaving as mutually interacting elements where there exists a plurality of actual distances $c_i$ that satisfies the constraints.

In another aspect of the present invention the expressing step comprises maintaining an upper bound and a lower bound on each of the plurality of theoretical distances $c_i$, and the determining step comprises determining where the lower bound is smaller than or equal to the higher bound for any of the constraints.

In another aspect of the present invention the expressing step comprises expressing each of the constraints using a plurality of samples $a_n$ of one of the functions taken at times $a^t_1, a^t_2, \ldots, a^t_n$, a first plurality of time-consecutive samples $b_n$ and a second plurality of time-consecutive samples $b^t_n$ of the other of the functions taken at times $b^t_1, b^t_2, \ldots, b^t_n$, where $a^t_1 \leq b^t_1 \leq a^t_2 \leq b^t_2 \leq \ldots a^t_n \leq b^t_{n'}$, and selecting each of the constraints from of a set of constraints defined by the pattern $a_1 - b_1 \leq c_1 \leq a_2 - b_1$, $a_2 - b_2 \leq c_2 \leq \min(a_2 - b_{1+}P(b'_2 - b'_1), a_3 - b_2) a_3 - b_3 \leq c_3 \leq \min(a_2 - b_{1+}P(b'_3 - b'_1), a_3 - b_{2+}P(b'_3 - b'_2), a_4 - b_3)$.

In another aspect of the present invention there is provided apparatus for correlating behavior between two elements of a system to determine the presence of mutual interaction between the elements, the apparatus including means for measuring the behavior of two elements of a system over time with respect to mutual interaction, thereby producing two behavior functions, means for expressing a plurality of constraints on a theoretical distance c between the behavior functions, and means for determining that the elements are behaving as mutually interacting elements where there exists an actual distance c satisfies the constraints.

In another aspect of the present invention the expressing means comprises means for maintaining an upper bound and a lower bound on the theoretical distance c, and the determining means comprises means for determining where the lower bound is smaller than or equal to the higher bound for any of the constraints.

In another aspect of the present invention the expressing means comprises means for expressing each of the constraints using at least two time-consecutive samples ($a_n$, $a_{n+1}$) of one of the functions and at least one sample ($b_n$) of the other of the functions that is time-intermediate the time-consecutive samples.

In another aspect of the present invention the expressing means comprises means for expressing each of the constraints as $(a_n-b_n) \leq c \leq (a_{n+1}-b_n)$.

In another aspect of the present invention the expressing means comprises means for expressing each of the distances using at least two time-consecutive samples ($a_n$, $a_{n+1}$) of one of the functions and at least one sample ($b_n$) of the other of the functions that is taken at the same time as one of the time-consecutive samples.

In another aspect of the present invention the expressing means comprises means for expressing each of the constraints as $(a_n-b_n) \leq c \leq (a_{n+1}-b_n)$.

In another aspect of the present invention there is provided apparatus for correlating behavior between two elements of a system to determine the presence of mutual interaction between the elements, the apparatus including means for measuring the behavior of two elements of a system over time with respect to mutual interaction, thereby producing two behavior functions, means for expressing a plurality of constraints for a plurality of theoretical distances $c_i$ between the behavior functions, and means for determining that the elements are behaving as mutually interacting elements where there exists a plurality of actual distances $c_i$ that satisfies the constraints.

In another aspect of the present invention the expressing means comprises means for maintaining an upper bound and a lower bound on each of the plurality of theoretical distances $c_i$, and where the determining means comprises means for determining where the lower bound is smaller than or equal to the higher bound for any of the constraints.

In another aspect of the present invention the expressing means comprises means for expressing each of the constraints using a plurality of samples $a_n$ of one of the functions taken at times $a^t_1, a^t_2 \ldots, a^t_n$, a first plurality of time-consecutive samples $b_n$ and a second plurality of time-consecutive samples $b'_n$ of the other of the functions taken at times $b'_1, b'_2 \ldots, b'_n$, where $a^t_1 \leq b^t_1 \leq a^t_2 \leq b^t_2 \leq \ldots a^t_n \leq b^t_{n'}$, and means for selecting each of the constraints from of a set of constraints defined by the pattern $a_1-b_1 \leq c_1 \leq a_2-b_1 a_2-b_2 \leq c_2 \leq \min(a_2-b_{1+}P(b'_2-b'_1), a_3-b_2)$ $a_3-b_3 \leq c_3 \leq \min(b'_2), a_4-b_3)$.

The disclosures of all patents, patent applications, and other publications mentioned in this specification and of the patents, patent applications, and other publications cited therein are hereby incorporated by reference in their entirety.

BRIEF DESCRIPTION OF THE DRAWINGS

The present invention will be understood and appreciated more fully from the following detailed description taken in conjunction with the appended drawings in which.

DETAILED DESCRIPTION OF PREFERRED EMBODIMENTS

Figure 1:
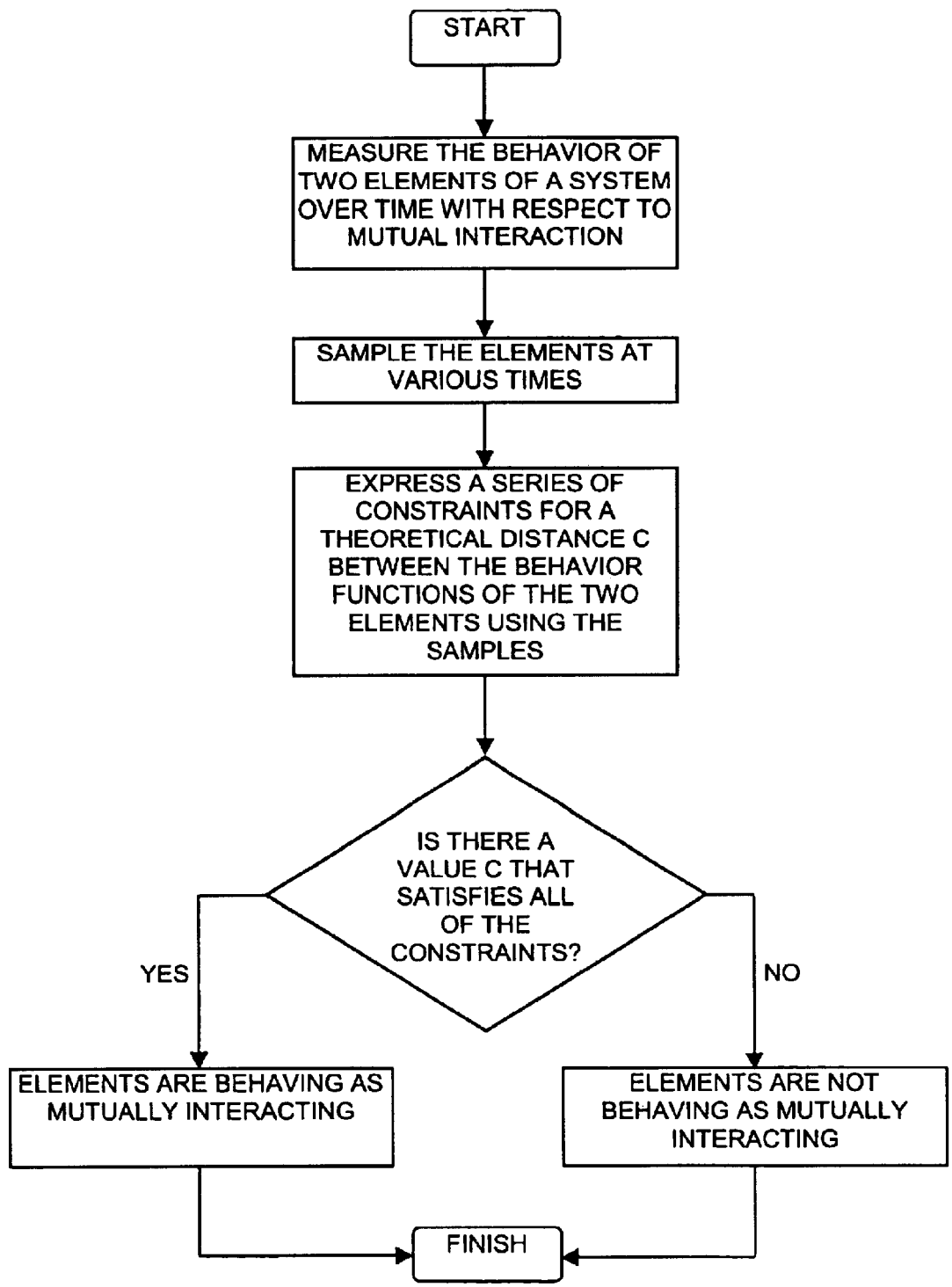
FIG. 1 is a simplified flowchart illustration of a method of behavior correlation, operative in accordance with a preferred embodiment of the present invention.
Figure 2:
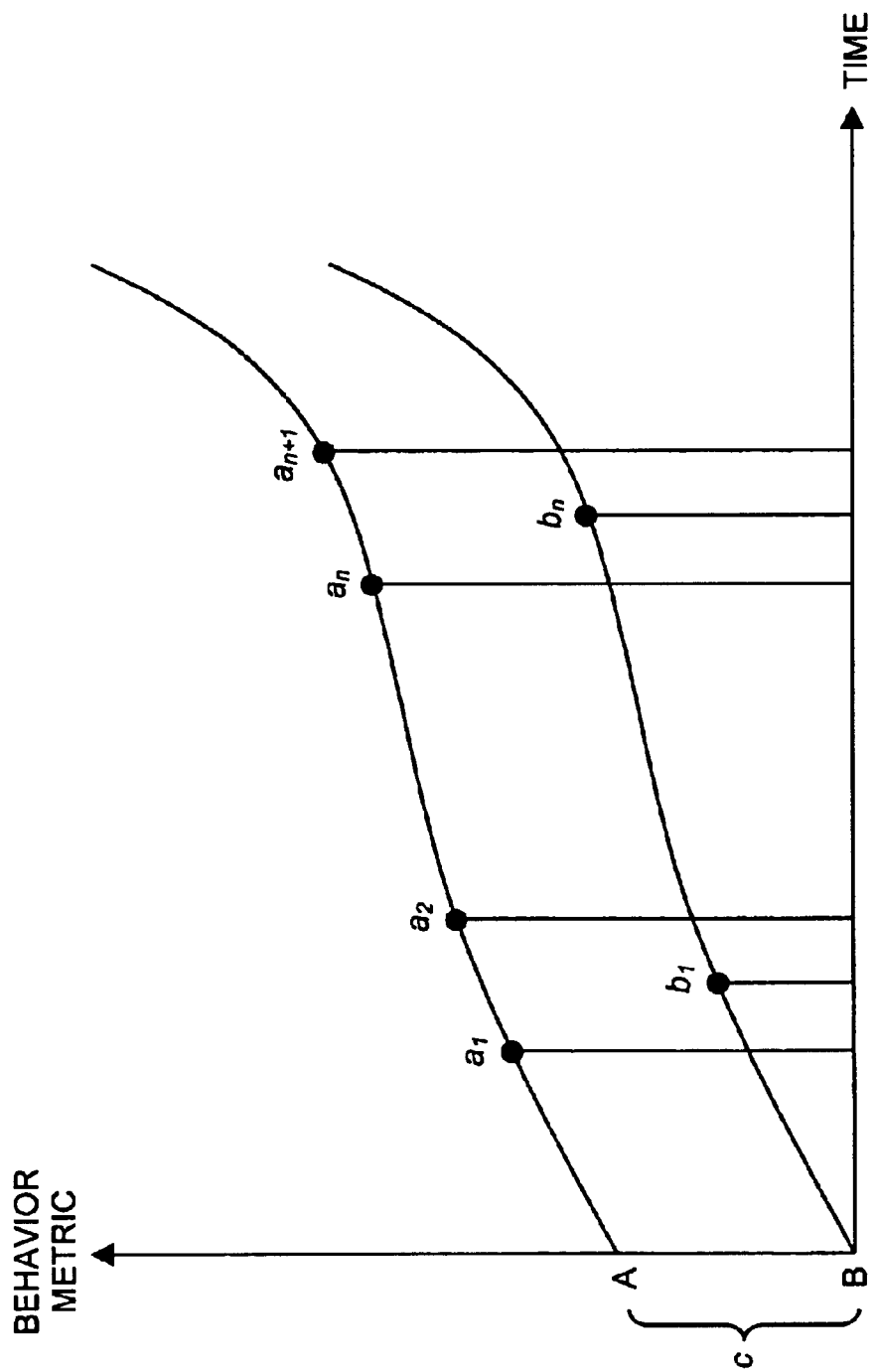
FIG. 2 is a simplified graphical illustration of behavior functions of two system elements, useful in understanding the method of FIG. 1.

Reference is now made to FIG. 1, which is a simplified flowchart illustration of a method of behavior correlation of mutually interacting system elements, operative in accordance with a preferred embodiment of the present invention, and additionally to FIG. 2, which is a simplified graphical illustration of behavior functions of two system elements, useful in understanding the method of FIG. 1. In the method of FIG. 1, the behavior of two elements of a system is measured over time with respect to mutual interaction. For example, in a computer network, the number of data packets transmitted by a device port A is measured over time, as is the number of data packets received by a device port B over the same time period (although the counters used might start with different values). In the present embodiment the behavior of A and B is expressed as monotonic increasing functions. Samples $a_1, a_2 \ldots, a_n$ are taken of port A at times $a^t_1, a^t_2 \ldots, a^t_n$, as are samples $b_1, b_2 \ldots, b_n$ taken of port B at times $b^t_1, b^t_2 \ldots, b^t_n$, such that $a^t_1 \leq b^t_1 \leq a^t_2 \leq b^t_2 \leq \ldots a^t_n \leq b^t_n$. A series of constraints on a theoretical distance c between the behavior functions of A and B may then be expressed using multiple $a_n-b_n-a_{n+1}$ sample groupings as follows:

$$(a_1-b_1) \leq c \leq (a_2-b_1)$$

$$(a_2-b_2) \leq c \leq (a_3-b_2)$$

$$\ldots$$

$$(a_n-b_n) \leq c \leq (a_{n+1}-b_n)$$

Thus, for each constraint, at least two time-consecutive samples are taken from one of the behavior functions, and at least one sample is taken from the other of the behavior functions that is either time-intermediate the time-consecutive samples or that is taken at the same time as one of said time-consecutive samples. It will be appreciated that either of the behavior functions may serve as the source of a or b samples, provided that it is so used for each of the constraints.

If A and B are behaving as mutually interacting elements, then there exists an actual value c that satisfies all of the constraints. It may be seen that each constraint places an upper bound and a lower bound on c such that each inequality may act to tighten the bounds. Conversely, if there is no value c that satisfies the series of constraints, then it may be determined that A and B are not behaving as mutually interacting elements.

Some systems, including computer networks, have mutually interacting elements whose behavior functions diverge over time with respect to one another. For example, where a variable-length-packet switch mutually interacts with a fixed-length-cell switch, packets are converted into cells before transmission by the packet switch to the cell switch. Where a variable-length packet is not evenly divisible by the length of a fixed-length cell, the last cell is padded with zero bytes. Thus, a TCP/IP packet 1000 bytes in length is converted to 20 ATM cells of 56 bytes each, including an 8 byte header and 48 bytes of packet data, plus an additional ATM cell of 56 bytes in length, including an 8 byte header, the last 40 bytes of packet data, and 8 bytes of padding. In order to measure the behavior of the two switches over time with respect to mutual interaction, the behavior functions of the switches should be expressed in common units of measure. However, since the packet switch counts only packets and bit octets (bytes) of actual data transmitted, while the cell switch counts only received cells which may include padding, multiplying the number of cells received at the cell switch by the number of bytes in a cell is likely to result in a received byte count that exceeds the transmitted byte count, thus resulting in diverging behavior functions, since subsequently transmitted packets might have padded cells as well.

Figure 3:
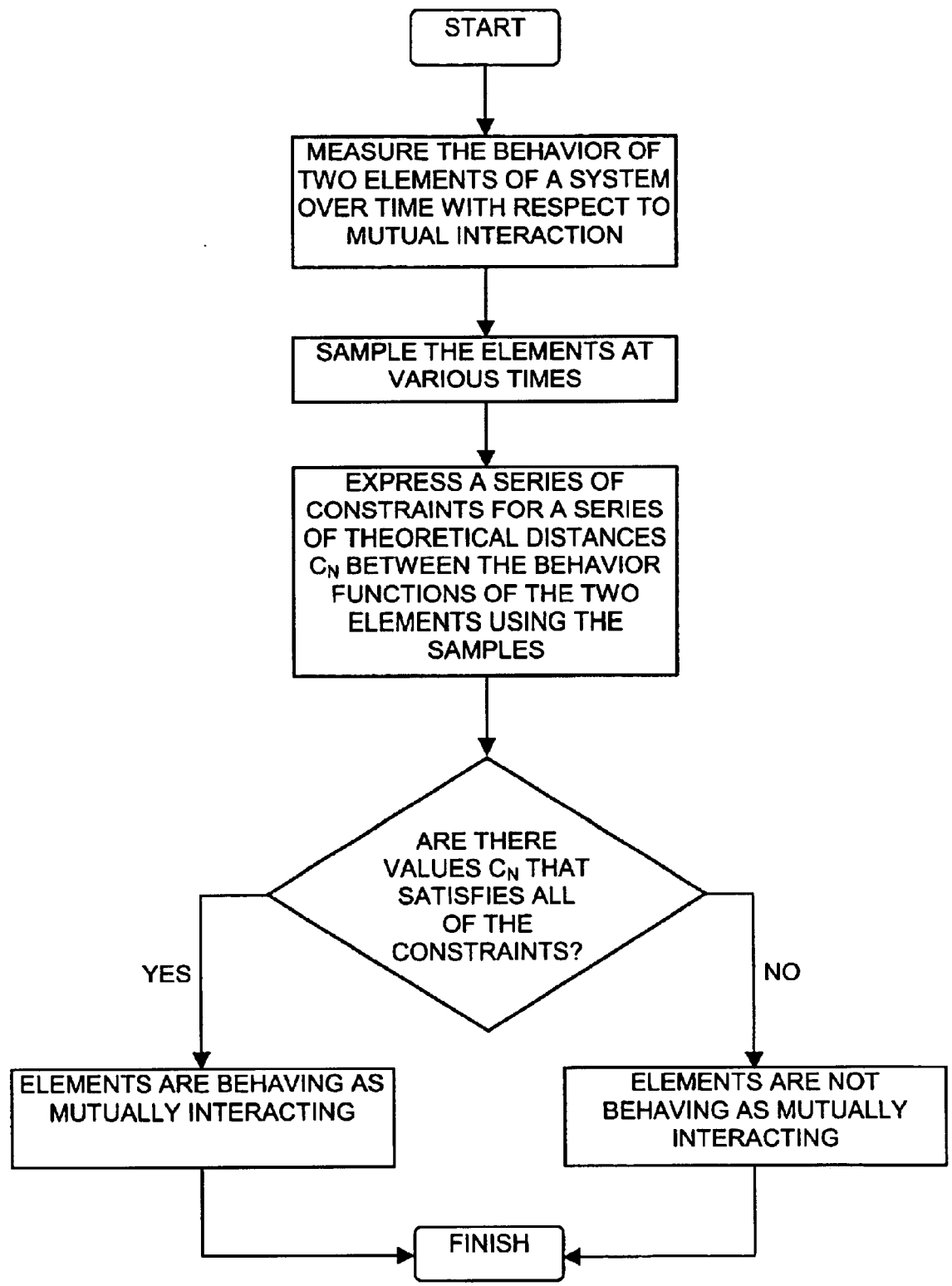
FIG. 3 is a simplified flowchart illustration of a method of behavior correlation of mutually interacting system elements with diverging behavior functions, operative in accordance with a preferred embodiment of the present invention.
Figure 4:
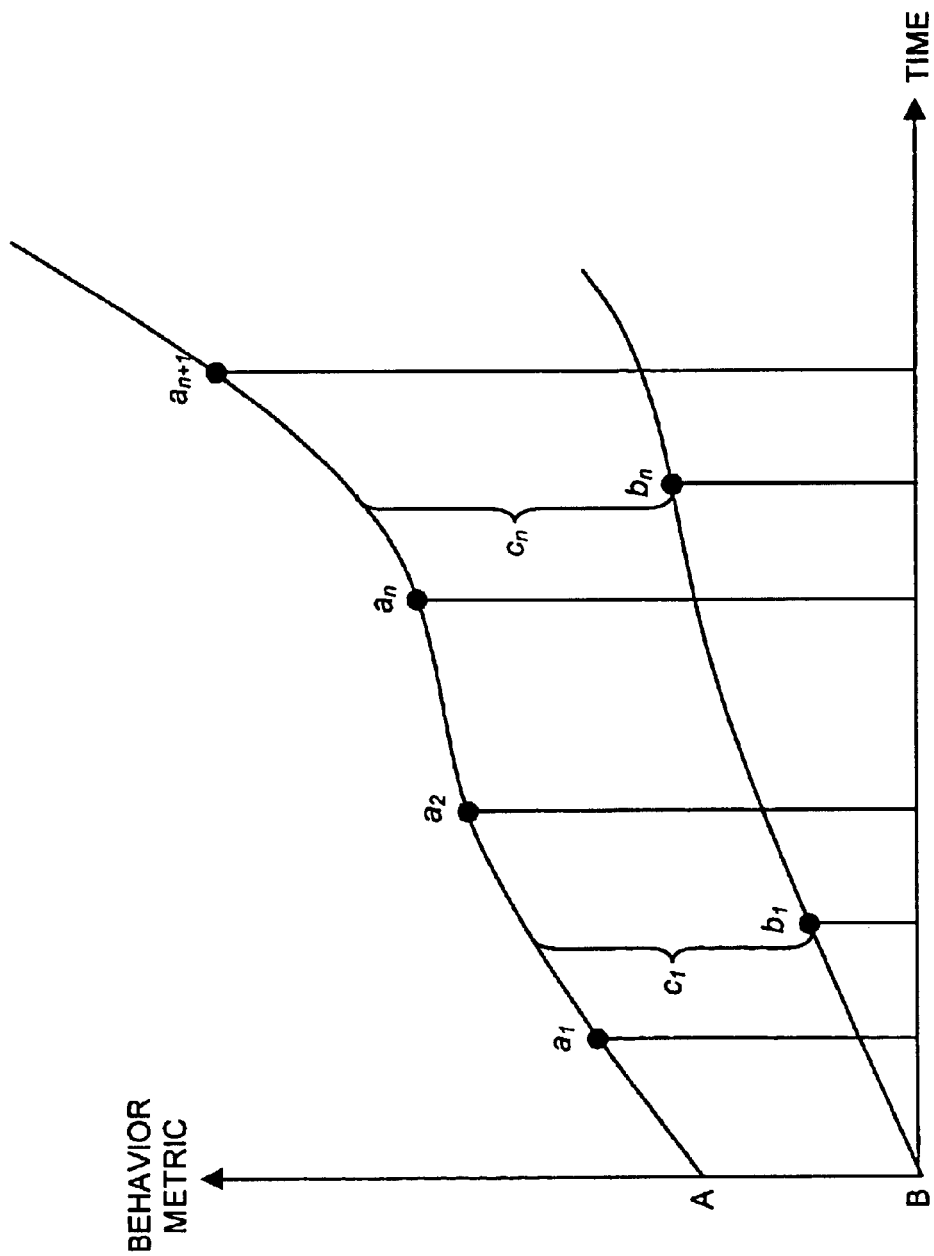
FIG. 4 is a simplified graphical illustration of diverging behavior functions of two system elements, useful in understanding the method of FIG. 3.

Reference is now made to FIG. 3, which is a simplified flowchart illustration of a method of behavior correlation of mutually interacting system elements with diverging behavior functions, operative in accordance with a preferred embodiment of the present invention, and additionally to FIG. 4, which is a simplified graphical illustration of diverging behavior functions of two system elements, useful in understanding the method of FIG. 3. In the method of FIG. 3, the behavior of two elements of a system where diverging behavior may be present is measured over time with respect to mutual interaction. For example, in a computer network, where a determination is to be made of the mutual interaction between a cell switch A and a packet switch B, the number of data cells received by cell switch A is measured over time, as is the number of data packets and data octets transmitted by packet switch B over the same time period (although the counters used might start with different values). In the present embodiment the behavior of A and B are expressed as diverging monotonic increasing functions due to cell padding as described hereinabove. Sample cell counts $a_1, a_2 \ldots, a_n$ are taken of switch A at times $a^t_1, a^t_2 \ldots, a^t_n$, as are sample octet counts $b_1, b_2 \ldots, b_n$, and sample packet counts $b'_1, b'_2 \ldots, b'_n$ taken of switch B at times $b^t_1, b^t_2, \ldots, b^t_n$, such that $a^t_1 \leq b^t_1 \leq a^t_2 \leq b^t_2 \leq \ldots \leq a^t_n \leq b^t_n$. It may then be determined that A and B are behaving as mutually interacting elements if there exists a series of distances $c_1, c_2, \ldots c_n$, between the behavior functions of A and B such that:

1) $a_1 \leq b_1 + c_1 \leq a_2 \leq b_2 + c_2 \leq \ldots b_{n+cn}$
and
2) for each (i,j) where i<j, $c_j \leq c_{i+P}(b'_j - b'_i)$, where P is a padding factor, such as 48 or 56 bytes in the present example.

Thus, a series of constraints on theoretical distances $c_1, c_2, \ldots c_n$ may be selected from of a set of constraints defined by the pattern below using multiple samples:

$$a_1 - b_1 \leq c_1 \leq a_2 - b_1$$

$$a_2 - b_2 \leq c_2 \leq \min(a_2 - b_1 + P(b'_2 - b'_1), a_3 - b_2)$$

$$a_3 - b_3 \leq c_3 \leq \min(a_2 - b_1 + P(b'_3 - b'_1), a_3 - b_2 + P(b'_3 - b'_2), a_4 - b_3)$$

For each constraint an upper bound and a lower bound is maintained on the distance $c_i$, where the samples are used to tighten the bound. Should the lower bound be larger than the higher bound for any of the constraints, the elements cannot mutually interact. Thus, if there exist actual distances $c_i$ between the diverging monotonic increasing functions of A and B that satisfies the series of constraints, then it may be determined that A and B are behaving as mutually interacting elements. Otherwise, it may be determined that A and B are not behaving as mutually interacting elements.

It is appreciated that one or more of the steps of any of the methods described herein may be omitted or carried out in a different order than that shown, without departing from the true spirit and scope of the invention.

While the methods and apparatus disclosed herein may or may not have been described with reference to specific hardware or software, it is appreciated that the methods and apparatus described herein may be readily implemented in hardware or software using conventional techniques.

While the present invention has been described with reference to one or more specific embodiments, the description is intended to be illustrative of the invention as a whole and is not to be construed as limiting the invention to the embodiments shown. It is appreciated that various modifications may occur to those skilled in the art that, while not specifically shown herein, are nevertheless within the true spirit and scope of the invention.

What is claimed is:

1. A method for correlating behavior between two elements of a system to determine the presence of mutual interaction between the elements, the method comprising:

measuring the behavior of two elements of a system over time with respect to mutual interaction, thereby producing two behavior functions;

expressing a plurality of constraints on a theoretical distance c between said behavior functions; and determining that said elements are behaving as mutually interacting elements where there exists an actual distance c that satisfies said constraints, wherein said expressing step comprises expressing each of said constraints using at least two time-consecutive samples $(a_n, a_{n+1})$ of one of said functions and at least one sample $(b_n)$ of the other of said functions that is time-intermediate said time-consecutive samples.

2. A method according to claim 1 wherein said expressing step comprises expressing each of said constraints as $(a_n - b_n) \leq c \leq (a_{n+1} - b_n)$.

3. A method for correlating behavior between two elements of a system to determine the presence of mutual interaction between the elements, the method comprising:

measuring the behavior of two elements of a system over time with respect to mutual interaction, thereby producing two behavior functions;

expressing a plurality of constraints on a theoretical distance c between said behavior functions; and determining that said elements are behaving as mutually interacting elements where there exists an actual distance c that satisfies said constraints, wherein said expressing step comprises expressing each of said distances using at least two time-consecutive samples $(a_n, a_{n+})$ of one of said functions and at least one sample $(b_n)$ of the other of said functions that is taken at the same time as one of said time-consecutive samples.

4. A method according to claim 3 wherein said expressing step comprises expressing each of said constraints as $(a_n - b_n) \leq c \leq (a_{n+1} - b_n)$.

5. A method for correlating behavior between two elements of a system to determine the presence of mutual interaction between the elements, the method comprising:

measuring the behavior of two elements of a system over time with respect to mutual interaction, thereby producing two behavior functions;

expressing a plurality of constraints for a plurality of theoretical distances $c_i$ between said behavior functions; and determining that said elements are behaving as mutually interacting elements where there exists a plurality of actual distances $c_i$ that satisfies said constraints, wherein said expressing step comprises:

expressing each of said constraints using a plurality of samples $a_n$ of one of said functions taken at times $a^t_1$, $a^t_2 \ldots, a^t_m$ first plurality of time-consecutive samples $b_n$ and a second plurality of time-consecutive samples $b'_n$ of the other of said functions taken at times $b'_1$, $b'_2 \ldots, b'_n$, wherein $a^t_1 \leq b^t_1 \leq a^t_2 \leq b^t_2 \leq \ldots a^t_n \leq b^t_n$; and selecting each of said constraints from of a set of constraints defined by the pattern:

$$a_1-b_1 \leq c_1 \leq a_2-b_1$$

$$a_2-b_2 \leq c_2 \leq \min(a_2-b_1+P(b'_2-b'_1), a_3-b_2)$$

$$a_3-b_3 \leq c_3 \leq \min(a_2-b_1+P(b'_3-b'_1), a_3-b_2+P(b'_3-b'_2), a_4-b_3).$$

6. Apparatus for correlating behavior between two elements of a system to determine the presence of mutual interaction between the elements, the apparatus comprising:

means for measuring the behavior of two elements of a system over time with respect to mutual interaction, thereby producing two behavior functions;

means for expressing a plurality of constraints on a theoretical distance c between said behavior functions; and means for determining that said elements are behaving as mutually interacting elements where there exists an actual distance c that satisfies said constraints, wherein said expressing means comprises means for expressing each of said constraints using at least two time-consecutive samples $(a_n, a_{n+1})$ of one of said functions and at least one sample $(b_n)$ of the other of said functions that is time-intermediate said time-consecutive samples.

7. Apparatus according to claim 6 wherein said expressing means comprises means for expressing each of said constraints as $(a_n-b_n) \leq c \leq (a_{n+1}-b_n)$.

8. Apparatus for correlating behavior between two elements of a system to determine the presence of mutual interaction between the elements, the apparatus comprising:

means for measuring the behavior of two elements of a system over time with respect to mutual interaction, thereby producing two behavior functions;

means for expressing a plurality of constraints on a theoretical distance c between said behavior functions; and means for determining that said elements are behaving as mutually interacting elements where there exists an actual distance c that satisfies said constraints, wherein said expressing means comprises means for expressing each of said distances using at least two time-consecutive samples $(a_n, a_{n+1})$ of one of said functions and at least one sample $(b_n)$ of the other of said functions that is taken at the same time as one of said time-consecutive samples.

9. Apparatus according to claim 8 wherein said expressing means comprises means for expressing each of said constraints as $(a_n-b_n) \leq c \leq (a_{n+1}-b_n)$.

10. Apparatus for correlating behavior between two elements of a system to determine the presence of mutual interaction between the elements, the apparatus comprising:

means for measuring the behavior of two elements of a system over time with respect to mutual interaction, thereby producing two behavior functions;

means for expressing a plurality of constraints for a plurality of theoretical distances ci between said behavior functions; and means for determining that said elements are behaving as mutually interacting elements where there exists a plurality of actual distances $c_i$ that satisfies said constraints, wherein said expressing means comprises:

means for expressing each of said constraints using a plurality of samples $a_n$ of one of said functions taken at times $a^t_1$, $a^t_2 \ldots, a^t_n$, a first plurality of time-consecutive samples $b_n$ and a second plurality of time-consecutive samples $b^t_n$ of the other of said functions taken at times $b^t_1$, $b^t_2 \ldots, b^t_n$, wherein $a^t_1 \leq b^t_1 \leq a^t_2 \leq b^t_2 \leq \ldots a^t_n \leq b^t_n$; and means for selecting each of said constraints from of a set of constraints defined by the pattern:

$$a_1-b_1 \leq c_1 \leq a_2-b_1$$

$$a_2-b_2 \leq c_2 \leq \min(a_2-b_1+P(b'_2-b'_1), a_3-b_2)$$

$$a_3-b_3 \leq c_3 \leq \min(a_2-b_1+P(b'_3-b'_1), a_3-b_2+P(b'_3-b'_2), a_4-b_3).$$

* * * * *